(12) United States Patent
Fukui et al.

(10) Patent No.: US 10,185,211 B2
(45) Date of Patent: Jan. 22, 2019

(54) PROJECTION LIGHT SOURCE DEVICE

(71) Applicant: Panasonic Intellectual Property Management Co., Ltd., Osaka (JP)

(72) Inventors: Atsushi Fukui, Osaka (JP); Masaru Fujita, Osaka (JP)

(73) Assignee: PANASONIC INTELLECTUAL PROPERTY MANAGEMENT, CO., LTD., Osaka (JP)

( * ) Notice: Subject to any disclaimer, the term of this patent is extended or adjusted under 35 U.S.C. 154(b) by 0 days.

(21) Appl. No.: 15/874,944

(22) Filed: Jan. 19, 2018

(65) Prior Publication Data

US 2018/0259836 A1 Sep. 13, 2018

(30) Foreign Application Priority Data

Mar. 9, 2017 (JP) ................................ 2017-044449

(51) Int. Cl.
*G03B 21/14* (2006.01)
*G02B 5/02* (2006.01)
*G03B 21/20* (2006.01)
*G02B 27/09* (2006.01)

(52) U.S. Cl.
CPC .......... *G03B 21/2033* (2013.01); *G02B 5/02* (2013.01); *G02B 27/0955* (2013.01)

(58) Field of Classification Search
CPC ...... G02B 5/02; G02B 27/02; G02B 27/0955; G03B 21/208
See application file for complete search history.

(56) References Cited

U.S. PATENT DOCUMENTS

| 8,465,193 | B1 | 6/2013 | Arik et al. |
| 8,550,633 | B2* | 10/2013 | Utsunomiya .......... G02B 27/48 |
| | | | 349/64 |
| 2002/0048088 | A1 | 4/2002 | Kashima et al. |
| 2009/0091919 | A1 | 4/2009 | Goto |
| 2010/0271599 | A1* | 10/2010 | Miyazaki ............... G03B 21/14 |
| | | | 353/38 |
| 2011/0304829 | A1 | 12/2011 | Enomoto et al. |
| 2013/0265774 | A1 | 10/2013 | Umeda et al. |
| 2014/0028985 | A1* | 1/2014 | Janssens ................ G02B 27/48 |
| | | | 353/31 |
| 2017/0184952 | A1* | 6/2017 | Kurosaki ............. G02B 3/0006 |

FOREIGN PATENT DOCUMENTS

| JP | 9-307174 | 11/1997 |
| JP | 2012-002839 | 1/2012 |
| JP | 2012-099413 | 5/2012 |
| JP | 2016-045415 | 4/2016 |
| WO | 2007/094426 | 8/2007 |
| WO | 2009/054446 | 4/2009 |

OTHER PUBLICATIONS

Extended European Search Report dated Jul. 4, 2018 in European Application No. 17209931.9.

* cited by examiner

*Primary Examiner* — William C Dowling
(74) *Attorney, Agent, or Firm* — Wenderoth, Lind & Ponack, L.L.P.

(57) ABSTRACT

A projection light source device according to the present disclosure includes a light source, and a collimating lens that substantially collimates light emitted from the light source, an intermediate diffusion plate that diffuses the emitted light of the collimating lens, and an emission surface diffusion plate that has a weaker diffusibility than the intermediate diffusion plate and diffuses the emitted light of the intermediate diffusion plate.

9 Claims, 8 Drawing Sheets

PROJECTION LIGHT SOURCE DEVICE

BACKGROUND

1. Technical Field

The present disclosure relates to a projection light source device used for a light source for distance measurement.

2. Description of the Related Art

The projection light source device is used for light source or the like of a distance measurement device.

As a method of the distance measurement device, various distance measurement methods have been proposed and put to practical use. For example, there have been an old triangulation method, a phase difference detection method for measuring a phase difference between reflected light from an object to be measured and the light source by performing amplitude modulation on the light of the light source, or a time of flight (TOF) method of measuring the distance by measuring the arrival time of the reflected light of the object to be measured by irradiating with light of extremely short pulse which has recently been used.

In any of the distance measuring methods, to increase the measurable distance and increase the measurement accuracy, it is necessary to use a semiconductor laser as a light source because the light source requires small-sized high power, high frequency modulation, or a very short pulse waveform.

Regarding the use of the laser light source, safety standards are provided from the viewpoint of safety to a human body and eyes. In Japan, the standards are stipulated in JIS-C6802, and in a case that there is a possibility of light entering the eyes of a person, it is generally necessary to satisfy the condition of Class 1 of safety standards. In order to satisfy the condition of the Class 1 and increase the output of the laser light source, it is necessary to increase a beam diameter of a laser beam on an emission surface of a projection device. When the person looks at a projection light source device, if an emission diameter on the emission surface of the projection light source device is small, a light source image formed on a retina of an eye also becomes small, thus the concentration of light becomes high, and the eye is likely to be damaged. In order to prevent the damage, it is possible to enlarge the light source image formed on the retina by increasing the emission diameter of the emission surface of the projection light source device, and to increase the maximum value of the light output of the laser light source which does not damage eyes.

In a conventional projection light source device, there is a device in which a diffusion plate is disposed in a window of an emission portion of a semiconductor laser. FIG. 9 shows a conventional projection light source device disclosed in Japanese Patent Unexamined Publication No. 9-307174.

FIG. 9 shows laser light source 31, concave lens 32 for spreading light emitted from laser light source 31, diffusion plate 33, and metal package 34 for holding laser light source 31, concave lens 32, and diffusion plate 33.

Light emitted from laser light source 31 is diffused by concave lens 32, and light is projected to the diffusion plate 33. In diffusion plate 33, the light is diffused in the same direction. By using concave lens 32, the beam diameter at diffusion plate 33 is increased. The beam diameter of laser light source 31 is very small as several μm, but by using diffusion plate 33, a beam diameter which is much larger than the beam diameter on the emission surface of laser light source 31 is formed on diffusion plate 33, when the person looks at the laser, the image of the light source formed on the retina of the eye becomes large, and an upper limit of the laser output which does not damage the eye may be increased.

SUMMARY

The projection light source device according to the present disclosure includes a light source, and a collimating lens that substantially collimates light emitted from the light source, an intermediate diffusion plate that diffuses the emitted light of the collimating lens, and an emission surface diffusion plate that has a weaker diffusibility than the intermediate diffusion plate and diffuses the emitted light of the intermediate diffusion plate.

According to this configuration, by spreading a laser beam, collimating light and spreading the light in the horizontal direction and the vertical direction by the intermediate diffusion plate whose cross section is wave-like, and making the light distribution on an emission surface of the projection light source device uniform by an emission surface diffusion plate, it is possible to emit light having a uniform and wide radiation angle with a small light loss at the diffusion plate, enlarge a beam diameter at the emission surface, and increase the laser light source output within the range of Class 1 of safety standards.

DETAILED DESCRIPTION

Prior to describing the exemplary embodiments, problems in the related art will be briefly described.

Figure 9:
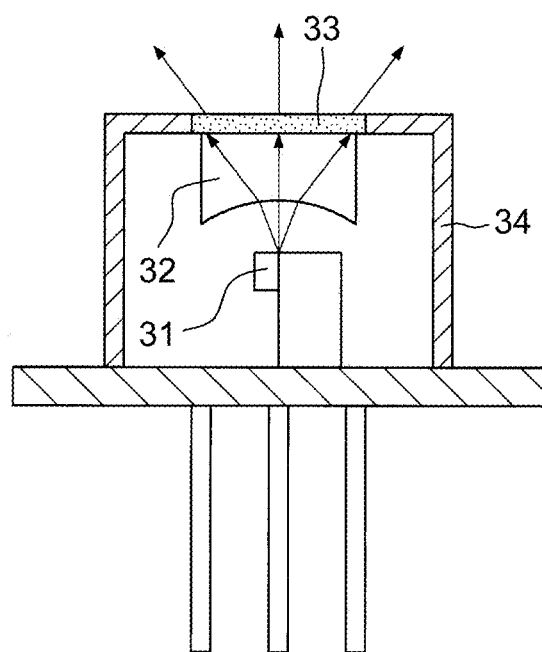
FIG. 9 is a diagram showing a projection light source device disclosed in Japanese Patent Unexamined Publication No. 9-307174.

As shown in FIG. 9, since the light emitted from laser light source 31 is spread by concave lens 32 and irradiated to diffusion plate 33, incident angles of light to diffusion plate 33 in a center portion and a peripheral portion of diffusion plate 33 are different.

That is, at the central portion of diffusion plate 33, light is incident substantially perpendicularly on an emission surface of diffusion plate 33, but at the peripheral portion of diffusion plate 33, the light is obliquely incident on the emission surface of diffusion plate 33. Therefore, when a person looks at the projection light source device, in order to increase the beam diameter on the surface of diffusion plate 33, it is necessary to use a diffusion plate with very high diffusibility. In a general diffusion plate having a slit glass shape, the diffusibility is increased, the reflection from the diffusing surface is increased, and the light use efficiency is greatly reduced. Further, diffusion characteristics of diffusion plates with high diffusibility are generally Lambertian diffusion, and there is a problem that light in oblique direction becomes weak.

The present disclosure provides a projection light source device capable of emitting light having a uniform and wide radiation angle with a small light loss at a diffusion plate and enlarging the beam diameter at an emission surface of a projection device.

The projection light source device according to the present disclosure includes a light source, and a collimating lens that substantially collimates light emitted from the light source, an intermediate diffusion plate that diffuses the emitted light of the collimating lens, and an emission surface diffusion plate that has a weaker diffusibility than the intermediate diffusion plate and diffuses the emitted light of the intermediate diffusion plate.

More specifically, the light source is a laser light source.

In addition, the laser light source is characterized in that a plurality of laser light sources are arranged adjacent to each other.

In addition, the intermediate diffusion plate has a structure in which a concave shape and a convex shape are smoothly connected and arranged.

In addition, the emission surface diffusion plate is characterized in that a surface having a concave shape and a convex shape is disposed on the light source side.

In addition, the intermediate diffusion plate is characterized in that the width of the convex shape is wider than the width of the concave shape.

In addition, the intermediate diffusion plate includes a first diffusion plate of a cross-section extruded shape formed in the convex shape and the concave shape, and a second diffusion plate of a cross-section extruded shape formed in the convex shape and the concave shape and is characterized in that the first diffusion plate and the second diffusion plate are disposed close to each other so that a groove direction of the convex shape and the concave shape of the first diffusion plate and a groove direction of the convex shape and the concave shape of the second diffusion plate are orthogonal to each other.

In addition, the collimating lens, the first diffusion plate, the second diffusion plate, and the emission surface diffusion plate are disposed in order from the light source, and a distance between the collimating lens and the first diffusion plate is L1, a distance between the first diffusion plate and second diffusion plate is L2, and a distance between the second diffusion plate and the emission surface diffusion plate is L3 so as to be L2<L1<L3.

In addition, when the emission surface diffusion plate is formed such that an array interval pitch between the convex shape and the concave shape of the second diffusion plate is set to be p and a diffusion angle of the emission surface diffusion plate is set to be a full width at half maximum η, distance L3 between the second diffusion plate and the emission surface diffusion plate is set as at least $L3 \geq p/(2 \times \tan(\eta))$.

Hereinafter, the projection light source device of the present disclosure will be described based on an exemplary embodiment.

Figure 1:
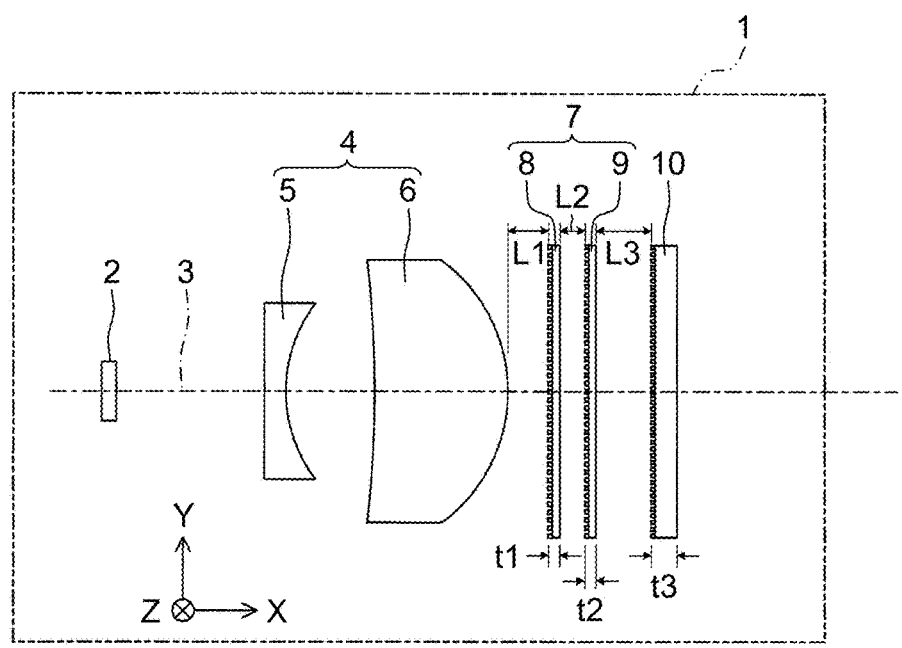
FIG. 1 is a schematic diagram of a projection light source device according to an exemplary embodiment of the present disclosure.

FIG. 1 shows projection light source device 1 of the present disclosure.

In FIG. 1, an X-axis is set to be the right and left direction of the page, a Y-axis is set to be the upward direction, and a Z-axis is set to be the backward direction of the page. Reference numeral 2 denotes a laser light source as a light source, which emits light in the X-axis direction. A near infrared wavelength is used so that laser light is not visible.

Optical axis 3 of projection light source device 1 is a straight line that is parallel to the X axis and passes through the emission center of laser light source 2. Collimating lens 4 for substantially collimating the light emitted from laser light source 2 consists of a combination lens of concave lens 5 and a convex lens 6. The lens curvature center of the incident surface and the emission surface of concave lens 5 and the lens curvature center of the incident surface and the emission surface of the convex lens 6 are disposed on optical axis 3. The focus of the combination lens of concave lens 5 and convex lens 6 is also disposed on optical axis 3. Furthermore, on optical axis 3, first diffusion plate 8 and second diffusion plate 9 constituting intermediate diffusion plate 7 for diffusing the emitted light of collimating lens 4 are disposed. Third diffusion plate 10 as an emission surface diffusion plate for diffusing the emitted light from the intermediate diffusion plate 7 is also arranged on optical axis 3.

Concave lens 5 is used for spreading the emitted light of laser light source 2 and obtaining a large beam diameter at a short distance. The material is transparent and polycarbonate resin or glass. If there is no influence of heat, acrylic resin may be used.

Convex lens 6 substantially collimates the light spread by concave lens 5 to the X axis direction. The material is transparent and polycarbonate resin or glass. If there is no influence of heat, acrylic resin may be used. In the combined lens consisting of concave lens 5 and convex lens 6, the focal position on the side of laser light source 2 is disposed so as to be substantially a light-emitting surface of laser light source 2.

Figure 2A:
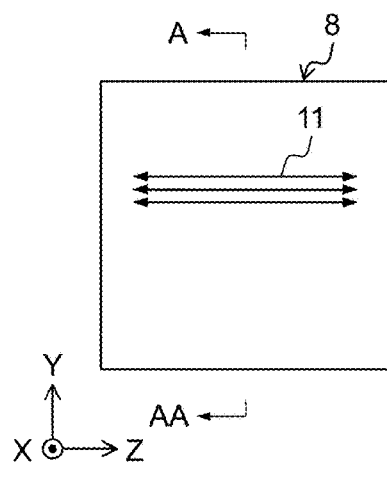
FIG. 2A is a diagram showing a structure of a first diffusion plate and a second diffusion plate in the exemplary embodiment of the present disclosure.
Figure 2B:
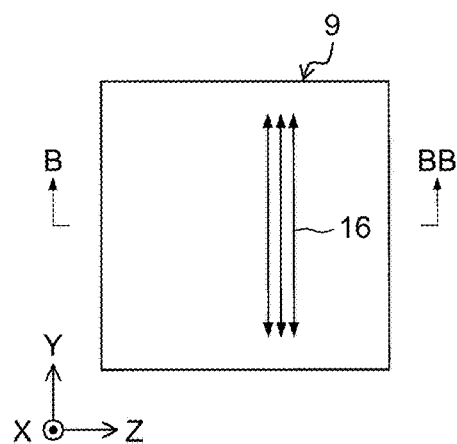
FIG. 2B is a diagram showing a structure of the first diffusion plate and the second diffusion plate in the exemplary embodiment of the present disclosure.
Figure 2C:
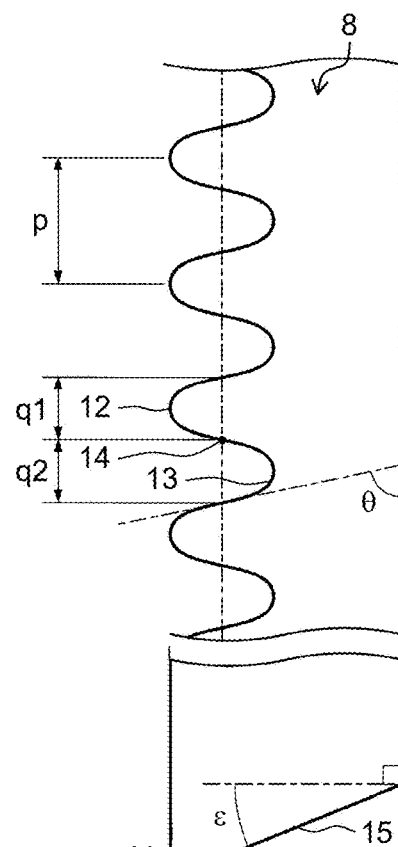
FIG. 2C is a diagram showing a structure of the first diffusion plate and the second diffusion plate in the exemplary embodiment of the present disclosure.

First diffusion plate 8 is a thin plate having a groove shape on the side of laser light source 2 and is disposed on a YZ plane. First diffusion plate 8 is disposed away from convex lens 6 by distance L1 and has thickness t1. FIG. 2A shows groove direction 11 of first diffusion plate 8, and a plurality of grooves are formed in the horizontal direction, that is, parallel to the Z-axis direction and spread the light in the vertical direction, that is, in the Y-axis direction. FIG. 2C is an enlarged view of a cross section taken along the line A-AA of FIG. 2A. The grooves of first diffusion plate 8 are formed at an equal pitch of pitch p, and convex shape 12 and concave shape 13 are joined at connection point 14.

That is, first diffusion plate 8 is an extruded shape of a cross section formed by convex shape 12 and concave shape 13 in the Y axis direction. Convex shape 12 and concave shape 13 are aspherical shapes and are smoothly connected at connection point 14. In the aspherical shape of convex shape 12, when collimating light is incident on first diffusion plate 8 with aberration such as spherical aberration, the parallel light is set not to be converged to one point inside first diffusion plate 8. Width q1 of convex shape 12 is formed to be larger than width q2 of concave shape 13, that is, q1>q2. Since convex shape 12 and concave shape 13 are connected smoothly at connection point 14, inclination angle θ with respect to the Z axis is the maximum angle at connection point 14. Side surface 15 of first diffusion plate 8 is formed to be inclined by e with respect to the X axis. The magnitude of the angle of the slope e is preferably 2° or more.

Second diffusion plate 9 is a thin plate having a groove shape on the side of laser light source 2, is disposed on the YZ plane and is parallel to first diffusion plate 8 and spreads the light in the vertical direction, that is, the Z axis direction. Second diffusion plate 9 is disposed at distance L2 from first diffusion plate 8 and has thickness of t2. FIG. 2B is a view showing groove direction 16 of second diffusion plate 9, in which grooves are formed in the vertical direction, that is, in the Y axis direction, and the groove direction of first diffusion plate 8 and the groove direction of second diffusion plate 9 are disposed to be orthogonal to each other. The groove shape of second diffusion plate 9 is similar to that of first diffusion plate 8. That is, the cross-sectional shape of second diffusion plate 9 taken along the B-BB line in FIG. 2B is the same as that of the first diffusion plate 8 in FIG. 2C.

Third diffusion plate 10 is a diffusion plate having a smaller degree of light diffusion than first diffusion plate 8 and second diffusion plate 9 and is a thin plate having a surface with a weaker diffusibility in the shape of a slit glass on the side of laser light source 2. The diffusion of third diffusion plate 10 is random and has a structure in which diffraction or speckle hardly occurs when laser light is incident. Third diffusion plate 10 is disposed at distance L3 from second diffusion plate 9 and has thickness t3. Third diffusion plate 10 is disposed on the YZ plane and is parallel to second diffusion plate 9.

When the light parallel is incident on third diffusion plate 10, in the light diffusion of third diffusion plate 10, the light is spread in an angular range of η at the full width at half maximum. In order to obtain uniform light on the emission surface of third diffusion plate 10, distance L3 between third diffusion plate 10 and second diffusion plate 9 is L3≥p/(2× tan (η)). In addition, first diffusion plate 8, second diffusion plate 9, and third diffusion plate 10 are disposed to satisfy L2<L1<L3. The thicknesses of first diffusion plate 8, second diffusion plate 9, and third diffusion plate 10 satisfy t1<t3, t2<t3, and t1 and t2 are almost the same.

The operation of projection light source device 1 configured as described above will be described.

In FIG. 1, the light emitted from laser light source 2 is spread by concave lens 5 and collimated by convex lens 6. Since the focal position of the combination lens of concave lens 5 and convex lens 6 on the side of the laser light source 2 is disposed so as to be the light-emitting surface of laser light source 2, the light emitted from laser light source 2 is collimated by concave lens 5 and convex lens 6.

Figure 3A:
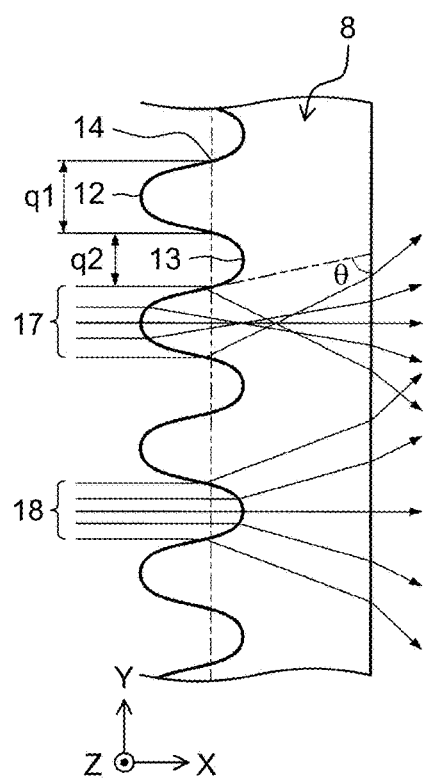
FIG. 3A is a diagram showing light rays at a diffusion plate in the exemplary embodiment of the present disclosure.

The collimated light is incident on first diffusion plate 8. FIG. 3A shows the spread of light at first diffusion plate 8. Light 17 incident on convex shape 12 of first diffusion plate 8 is condensed by the convex lens function of convex shape 12 and then diffused and emitted from first diffusion plate 8. Since the spread of light by first diffusion plate 8 is caused by refraction at the surface of convex shape 12, the maximum spread angle of the light is determined by the maximum angle of inclination angle θ of convex shape 12, that is, an inclination angle of convex shape 12 at connection point 14. Since light 17 incident on convex shape 12 is diffused after being condensed once, the light is hardly reflected in the adjacent concave shape. That is, the limitation when the spread angle of the light at first diffusion plate 8 is increased is unlikely to occur.

Figure 3B:
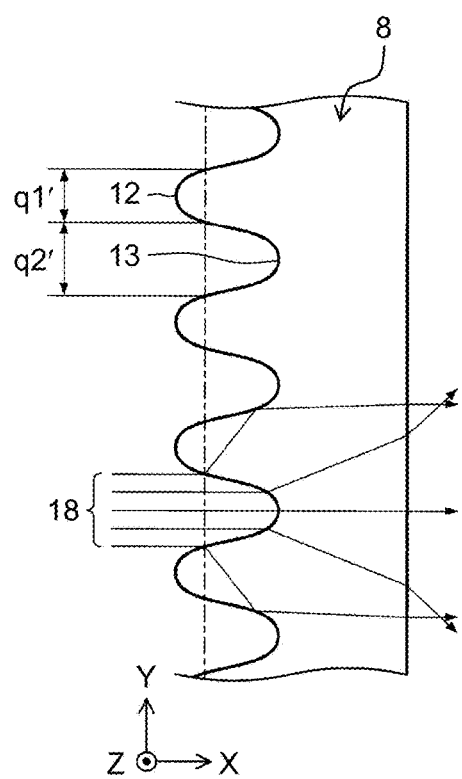
FIG. 3B is a diagram showing light rays at the diffusion plate in the exemplary embodiment of the present disclosure.

On the other hand, light 18 incident on the concave shape 13 of first diffusion plate 8 is diffused by the concave lens function of concave shape 13 and emitted from first diffusion plate 8. Since light 18 incident on concave shape 13 is diffused as it is, the light is likely to be reflected in the adjacent concave shape, but width q2 of concave shape 13 is disposed so that width q1 of convex shape 12 is smaller, that is, q2<q1, thus the distance to the adjacent concave shape becomes wide, and reflection in the adjacent concave shape hardly occurs. When q1>q2, as shown in FIG. 3B, and light 18 incident on the concave shape is refracted in the concave shape and is spread in first diffusion plate 8, since the distance between the adjacent concave shapes is short, reflection occurs, thus the spread angle of light at first diffusion plate 8 may not be increased. However, since q2<q1, the distance to the adjacent concave shapes becomes wide, reflection in the adjacent concave shapes hardly occurs, and light diffusion with a wide spread angle may be obtained.

Light emitted from laser light source 2 is collimated by concave lens 5 and convex lens 6, and first diffusion plate 8 spreads the light in a direction orthogonal to groove direction 11, that is, in the Y-axis direction. The spread of light at second diffusion plate 9 is also similar to that of first diffusion plate 8. Since groove direction 11 of first diffusion plate 8 as shown in FIG. 2A and groove direction 16 of second diffusion plate 9 shown in FIG. 2B are disposed so as to be orthogonal, in first diffusion plate 8, the light is spread in the XY plane, and in second diffusion plate 9, the light is spread in the XZ plane.

Figure 4A:
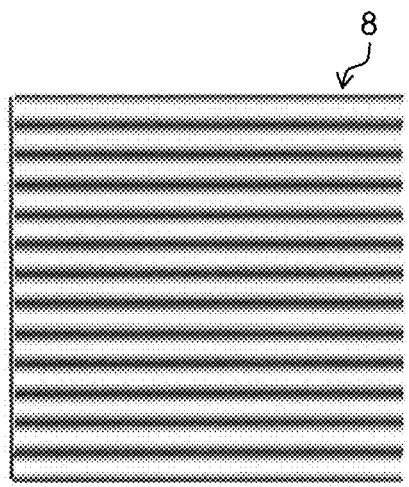
FIG. 4A is a luminance distribution diagram of emitted light of the first diffusion plate, the second diffusion plate and a third diffusion plate in the exemplary embodiment of the present disclosure.
Figure 4A:
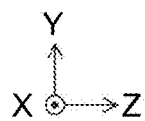

FIG. 4A shows a luminance distribution of the light emitted from first diffusion plate 8, which is a streaky distribution of brightness parallel to groove direction 11, that is, parallel to the Z-axis direction. The pitch of light and dark is ½ of groove pitch p of first diffusion plate 8.

Figure 4B:
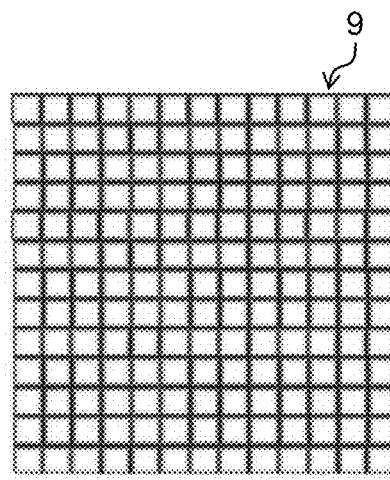
FIG. 4B is a luminance distribution diagram of emitted light of the first diffusion plate, the second diffusion plate and a third diffusion plate in the exemplary embodiment of the present disclosure.
Figure 4B:
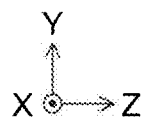

FIG. 4B shows the luminance distribution of the light emitted from second diffusion plate 9, and a streaky distribution of brightness parallel to groove direction 16, that is, parallel to the Y-axis direction is added. The pitch of light and dark is p/2 with respect to the groove pitch p of second diffusion plate 9. Since groove direction 11 of first diffusion plate 8 and groove direction 16 of second diffusion plate 9 are orthogonal to each other, the luminance distribution of second diffusion plate 9 is in the form of a lattice.

Figure 4C:
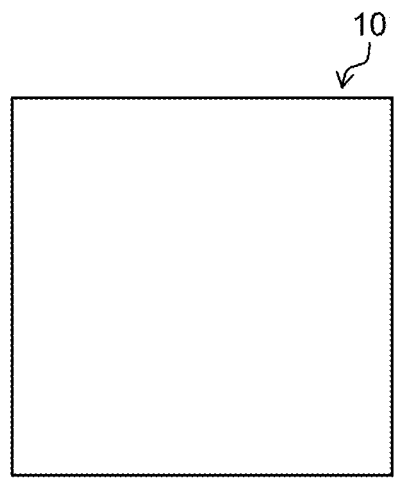
FIG. 4C is a luminance distribution diagram of emitted light of the first diffusion plate, the second diffusion plate and a third diffusion plate in the exemplary embodiment of the present disclosure.
Figure 4C:
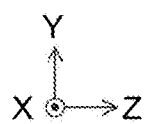

FIG. 4C shows the luminance distribution of the light emitted from third diffusion plate 10. Since the light diffusion of third diffusion plate 10 is the full width at half maximum η, by spreading the light by a distance L in the direction of optical axis 3, the distribution spreads by 2×L×tan (η/2) within the YZ plane. Since η is sufficiently small, 2×L×tan (η/2)≈L×tan (η). Since second diffusion plate 9 and third diffusion plate 10 are disposed away from each other by distance L3, and L3≥p/(2×tan (η)), the spread of the distribution in the Z plane is L×tan (η)≥p/2, in third diffusion plate 10, the spreading in the YZ plane becomes p/2 or more, and the luminance distribution of the pitch p/2 on second diffusion plate 9 may be made substantially uniform by the light diffusion of third diffusion plate 10. Since the luminance distribution on the emission surface of third diffusion plate 10, that is, on the emission surface of projection light source device 1 becomes uniform, when the person looks at projection light source device 1, the light intensity distribution of a light source image formed on the retina of the eye becomes uniform, thereby making it difficult to significantly damage the eyes as compared with the case where there is a locally high luminance location on the emission surface of projection light source device 1.

In addition, in projection light source device 1, after the light of laser light source 2 is collimated by concave lens 5 and convex lens 6, the spread angle of light is widened by first diffusion plate 8 and second diffusion plate 9, the beam diameter when looking at second diffusion plate 9 of projection light source device 1 is substantially the same as the beam diameter at convex lens 6 in any direction as long as the beam diameter is within the range of the spread angle of the emitted light of projection light source device 1. Therefore, since it is possible to make projection light source device 1 have a sufficiently large beam diameter regardless of any direction by widely spreading the light emitted from laser light source 2 with concave lens 5 and convex lens 6, when the person looks at the projection light source device, the light source image which is formed on the retina of the eye also becomes large, and light concentration may be reduced, even if the output of laser light source 2 is increased within the range of Class 1 of safety standards and the light emitted from the projection light source device is strengthened, the possibility of damaging the eyes may be made extremely low.

When laser light source 2 is turned on, laser light source 2 generates heat, and the concave lens 5, the convex lens 6, first diffusion plate 8, second diffusion plate 9, and third diffusion plate 10 are heated in this order from laser light source 2 side. When the steady state is reached after a lapse of time, the interior of projection light source device 1 reaches a substantially constant temperature, but in general, the temperature in the vicinity of third diffusion plate 10 in contact with the outside is likely to be influenced by an external temperature. In outdoors, the temperature difference between summer and winter, daytime and night becomes very large, and the change due to thermal expansion also increases. Since first diffusion plate 8 and second diffusion plate 9 are thin plates shaped and are located inside projection light source device 1 and temperature difference is unlikely to occur, distance L2 between first diffusion plate 8 and second diffusion plate 9 may be short. Since there is a possibility that convex lens 6 and first diffusion plate 8 deform the groove shape of first diffusion plate 8 by the convex portion of convex lens 6 when convex lens 6 and first diffusion plate 8 are in contact with each other, it is preferable that distance L1 between convex lens 6 and first diffusion plate 8 is larger than L2. Since third diffusion plate 10 is in contact with the outside, by increasing distance L3 between second diffusion plate 9 and third diffusion plate 10, the thermal change of second diffusion plate 9 within projection light source device 1 may be reduced.

In addition, since thickness t1 of first diffusion plate 8 and thickness t2 of second diffusion plate 9 are hardly influenced by the optical characteristics, it is preferable to be as thin as possible. However, since third diffusion plate 10 is directly in contact with the outside, a certain thickness is necessary to prevent deformation due to impact or the like. Therefore, by making the thicknesses of third diffusion plate 10 larger so as to be t1<t3 and t2<t3, it is possible to make the third diffusion plate strong against external shocks. In addition, a diffusion surface of third diffusion plate 10 is formed on the side of laser light source 2, and a surface on the opposite side, that is, the surface in the positive direction of the X-axis is made flat so that it is easy to clean when dirt or the like adheres.

On side surface 15 of first diffusion plate 8, inclination e is provided as shown in FIG. 2C. Most of the light incident on first diffusion plate 8 from the positive direction of the X axis is refracted at the incident surface and the emission surface and is emitted, but part of the light is reflected by the emission surface of first diffusion plate 8 and is propagated inside first diffusion plate 8 with total reflection. The light propagated inside first diffusion plate 8 is reflected by side surface 15 and is reflected again to convex shape 12 and concave shape 13, thus the light is emitted from first diffusion plate 8 as stray light. By giving side surface 15 the inclination e, at the time of reflection on side surface 15, a reflection angle is smaller than a total reflection angle and is shielded by a lens barrel of the projection device which holds a diffusion plate (not shown) to be emitted from the diffusion plate in the vicinity of side surface 15, thereby reducing stray light. The same applies to second diffusion plate 9.

Figure 5A:
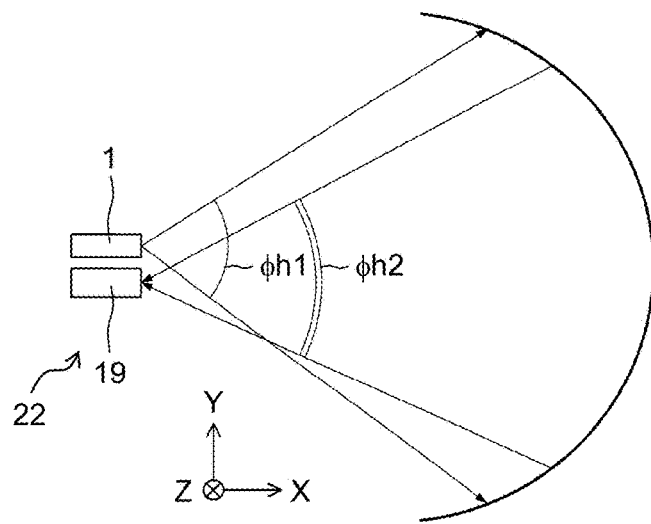
FIG. 5A is a diagram of a distance measurement device including the projection light source device according to the exemplary embodiment of the present disclosure.

FIG. 5A shows distance measurement device 22 using projection light source device 1 as a light source. Distance measurement device 22 includes projection light source device 1 and imaging unit 19. FIG. 5A shows a horizontal plane, that is, the XY plane, and φh1 shows the spread of the emitted light from projection light source device 1. φh2 indicates an imaging range of imaging unit 19, and φh1>φh2. Imaging unit 19 receives the light reflected from the object to be detected (not shown) by the light emitted from projection light source device 1 and measures the shape of the object to be detected and the distance to the object to be detected.

Figure 5B:
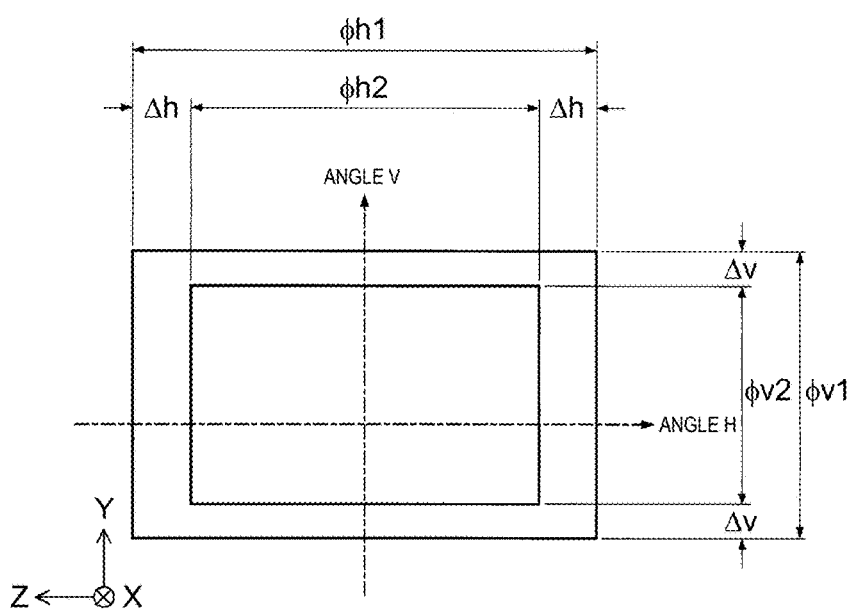
FIG. 5B is an explanatory diagram of an imaging unit according to the exemplary embodiment of the present disclosure.

The spread of light at projection light source device 1 on the YZ plane at distance measurement device 22 and the imaging range at imaging unit 19 are shown in FIG. 5B. The spread of projection light source device 1 in the vertical direction is φv1, the spread of imaging unit 19 in the vertical direction is φv2, and φv1>φv2. Generally, a sensor having a pixel structure has a rectangular shaped light-receiving surface. For this reason, the imaging range of imaging unit 19 is a rectangular shape, and by setting an irradiation range of projection light source device 1 to have a rectangular shape, it is possible to efficiently irradiate light and capture an image. The irradiation range of projection light source device 1 is set so that Δh>Δv when φh2−φh1=2×Δh and φv2·φv1=2×Δv. In a vehicle-mounted application or the like, in order to irradiate and image a wide range in the horizontal direction, it is possible to reduce the influence of an installation error by giving a wider tolerance of the irradiation range in the horizontal direction, that is, the Y axis direction.

According to such a configuration, by collimating the light emitted from laser light source 2 by concave lens 5 and convex lens 6, spreading the light in the vertical direction by first diffusion plate 8, spreading the light in the horizontal direction by the second diffusion plate 9, and uniforming the luminance distribution of the light emitted from second diffusion plate 9 by third diffusion plate 10, it is possible to provide a projection light source device capable of emitting light having a uniform and wide radiation angle with a small light loss at the diffusion plate, enlarging the beam diameter at the emission surface of the projection device, and increasing the laser light source output within Class 1 of safety standards.

Laser light source 2 may be a vertical surface light-emitting laser in which a multi-mode type semiconductor laser or a micro laser is adjacently arranged and may have a small spatial coherence, a light-emitting diode, or a light emitting diode (SLD) with a small emission diameter. If a speckle noise may increase, a single-mode type semiconductor laser may be used. In addition, HeNe, an argon gas laser, and the like may be used if the device may be increased in size.

The wavelength of laser light source 2 is set to be near infrared, but when the measurement light may be visible, visible light may be used. Alternatively, ultraviolet light may be used.

Concave lens 5 has the incident side as a flat surface and the emission side as a concave surface, but concave lens 5 is not limited thereto. The incident side may be concave and the emission side may be flat or both sides may be concave surfaces. An aspherical surface may be used for the lens surface. When the concave surface is disposed on the incident side, the return light to the laser light source slightly increases, thus it is preferable that the incident surface side is flat. In addition, although the cost increases, by attaching an anti-reflection film, the surface reflection of concave lens 5 may be reduced and the light utilization efficiency of the projection device may be increased.

Convex lens 6 has a loose concave surface on the incidence side and a convex surface on the emission side, but the present disclosure is not limited thereto. If the length of the optical system in the X-axis direction is obtained, returning light to the laser may be slightly reduced by making the incident surface side convex and the emission side loose concave. In addition, although the cost increases, by attaching an anti-reflection film, the surface reflection of the convex lens 6 may be reduced and the light utilization efficiency of the projection device may be increased.

Width q1 of convex shape 12 and width q2 of the concave shape are set so as to be q1>q2, but when the spread angle of light by the diffusion plate is small, q1=q2 or q1<q2 may be set.

The inclination e is given to the side surfaces of first diffusion plate 8 and second diffusion plate 9, but the side surface may be an absorbing surface or a sand sliding surface in black paint to reduce internal reflection from the side surface a diffusion surface. Alternatively, the side surface may be a curved surface.

In first diffusion plate 8 and second diffusion plate 9, groove pitch p may be the same or different. In addition, width q1 of the convex shape and width q2 of the concave shape may be the same or different.

The groove pitch of first diffusion plate 8 and second diffusion plate 9 is set to the same pitch, but the pitch may be slightly changed at random so as to alleviate the influence of laser diffraction or speckle.

The groove-forming surfaces of first diffusion plate 8 and second diffusion plate 9 are disposed on the side of laser light source 2, but may be disposed in the opposite direction if light utilization efficiency does not matter.

Light is spread in the Y axis direction by first diffusion plate 8 and is spread in the Z axis direction by second diffusion plate 9, but when it is unnecessary to widen the spread angle of light of either the Y axis or the Z axis, it is possible to omit the corresponding first diffusion plate 8 or second diffusion plate 9. By omitting first diffusion plate 8 or second diffusion plate 9, surface reflection is eliminated, thus the light efficiency of the projection light source device may be improved.

One imaging unit 19 and one projection light source device 1 are disposed, but a plurality of projection light source devices may be disposed to increase the amount of light. In addition, imaging unit 19 and projection light source device 1 are disposed in the horizontal direction, but may be disposed in the vertical direction. Imaging unit 19 and projection light source device 1 are disposed close to each other, but imaging unit 19 and projection light source device 1 may be disposed apart from each other.

Figure 6A:
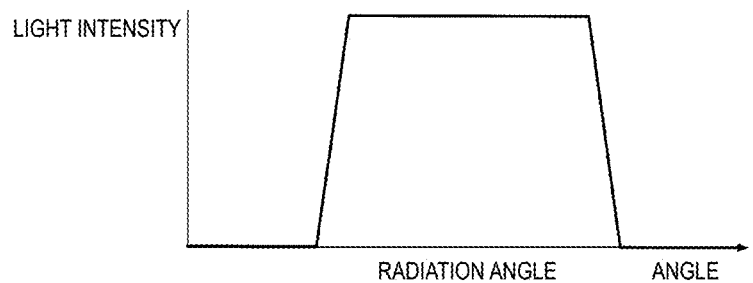
FIG. 6A is a diagram showing an angular distribution of light spread from the projection light source device in the exemplary embodiment of the present disclosure.
Figure 6B:
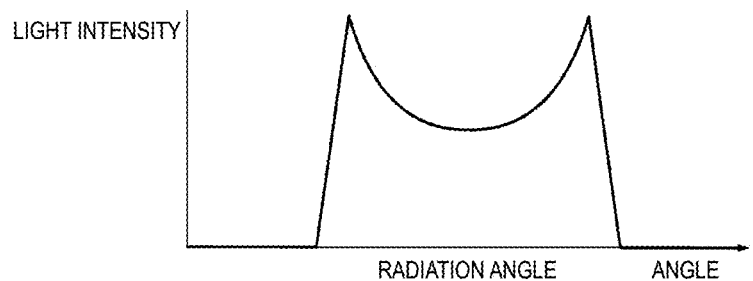
FIG. 6B is a diagram showing an angular distribution of light spread from the projection light source device in the exemplary embodiment of the present disclosure.
Figure 6C:
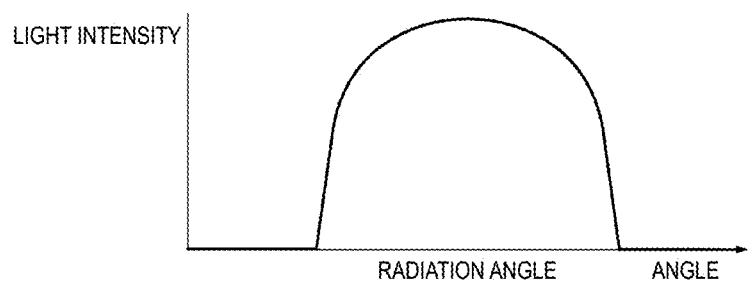
FIG. 6C is a diagram showing an angular distribution of light spread from the projection light source device in the exemplary embodiment of the present disclosure.

As shown in FIG. 6A, an angular radiation distribution of projection light source device 1 is set to be substantially constant irrespective of the angle, but as shown in FIG. 6B, the light intensity in the peripheral portion is increased and the light intensity in the central portion may be decreased, that is, in the 0 degree direction. Alternatively, as shown in FIG. 6C, the light intensity at the peripheral portion may be reduced and the light intensity at the central portion may be increased.

Figure 7:
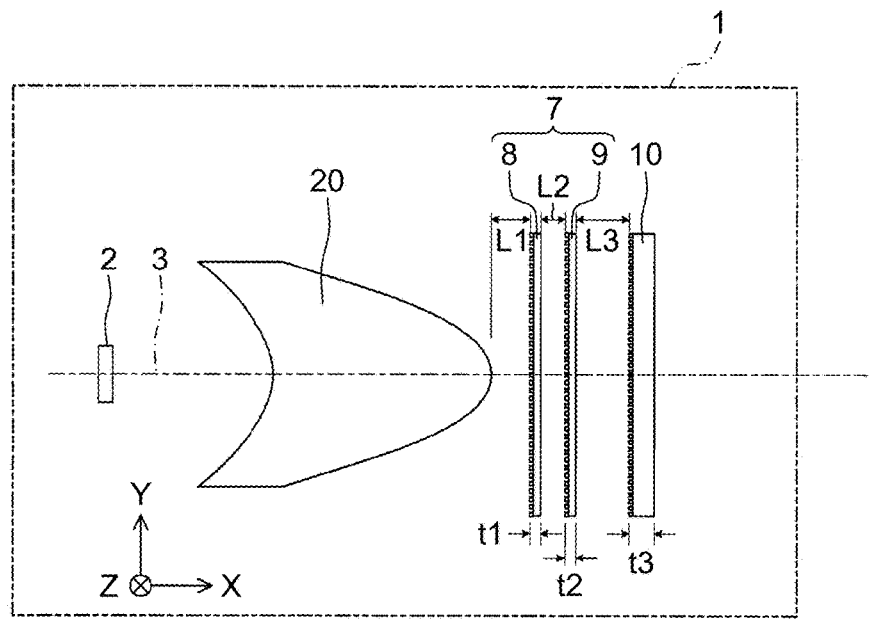
FIG. 7 is a schematic diagram of a single collimating lens in the exemplary embodiment of the present disclosure.

As shown in FIG. 7, concave lens 5 and convex lens 6 in FIG. 1 may be one lens like a lens 20 in FIG. 7. Lens 20 is a collimating lens according to the present disclosure. By reducing the number of lenses, the thickness of lens 20 increases and the weight increases, but by reducing the surface reflection, the light efficiency of projection light source device 1 may be improved.

Figure 8:
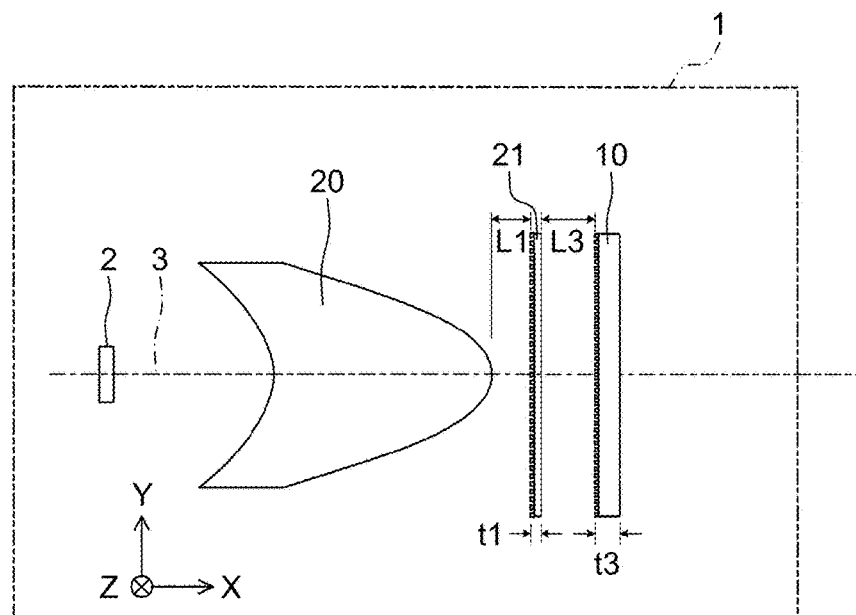
FIG. 8 is a schematic diagram showing two diffusion plates in the exemplary embodiment of the present disclosure.

In FIG. 1, the shapes of first diffusion plate 8 and second diffusion plate 9 are disposed such that the shape is constant in the cross-sectional direction and the groove direction is orthogonal to each other. By making the shape in the cross-sectional direction constant, it is easy to form the shape at the time of manufacture. On the other hand, although it is difficult to manufacture, as shown in FIG. 8, first diffusion plate 8 and second diffusion plate 9 in FIG. 1 may be formed as one diffusion plate like diffusion plate 21 in FIG. 8. Assuming that the groove depth of first diffusion plate 8 is a function f (y, z) and the groove depth of second diffusion plate 9 is a function g (y, z), diffusion plate 21 has a groove depth f (y, +g (y, z), thus, in a single diffusion plate, it is possible to obtain a spread angle of a rectangular light within the YZ plane as shown in FIG. 5B.

The projection light source device of the present disclosure is capable of emitting light having a uniform and wide radiation angle with a small light loss at the diffusion plate and enlarging the beam diameter at the emission surface of the projection device, and increasing the laser light source output within Class 1 of safety standards and may be applied to outdoor in-vehicle sensors and crime prevention sensors, light sources for distance sensors of domestic appliances such as indoor air conditioners and lighters.

What is claimed is:

1. A projection light source device comprising:
a light source;
a collimating lens that substantially collimates light emitted from the light source;
an intermediate diffusion plate that diffuses the emitted light of the collimating lens; and
an emission surface diffusion plate that has a weaker diffusibility than the intermediate diffusion plate and diffuses the emitted light of the intermediate diffusion plate.

2. The projection light source device of claim 1,
wherein the light source is a laser light source.

3. The projection light source device of claim 2,
wherein the laser light source includes a plurality of laser light sources arranged adjacent to each other.

4. The projection light source device of claim 1,
wherein the intermediate diffusion plate has a structure in which a concave shape and a convex shape are arranged so as to be smoothly connected to each other.

5. The projection light source device of claim 1,
wherein the emission surface diffusion plate has a surface on which a concave shape and a convex shape are formed, on the light source side.

6. The projection light source device of claim 4,
wherein the intermediate diffusion plate has a width of the convex shape larger than a width of the concave shape.

7. The projection light source device of claim 4,
wherein the intermediate diffusion plate includes
a first diffusion plate of a cross-section extruded shape formed in a convex shape and a concave shape, and
a second diffusion plate of a cross-section extruded shape formed in a convex shape and a concave shape, and
the first diffusion plate and the second diffusion plate are disposed close to each other so that a groove direction of the convex shape and the concave shape of the first diffusion plate and a groove direction of the convex shape and the concave shape of the second diffusion plate are orthogonal to each other.

8. The projection light source device of claim 7,
wherein the collimating lens, the first diffusion plate, the second diffusion plate, and the emission surface diffusion plate are disposed in order from the light source, and
when a distance between the collimating lens and the first diffusion plate is L1, a distance between the first diffusion plate and the second diffusion plate is L2, and a distance between the second diffusion plate and the emission surface diffusion plate is L3, L2<L1<L3 is satisfied.

9. The projection light source device of claim 8,
wherein when an array interval pitch between the convex shape and the concave shape of the second diffusion plate is p and a diffusion angle of the emission surface diffusion plate is a full width at half maximum $\eta$, the distance L3 between the second diffusion plate and the emission surface diffusion plate is set at least as $L3 \geq p/(2 \times \tan(\eta))$.

* * * * *